(No Model.)
A. MACDONALD.
PNEUMATIC TIRE.
No. 537,347. Patented Apr. 9, 1895.
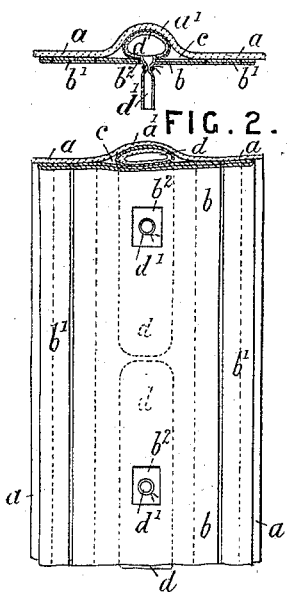
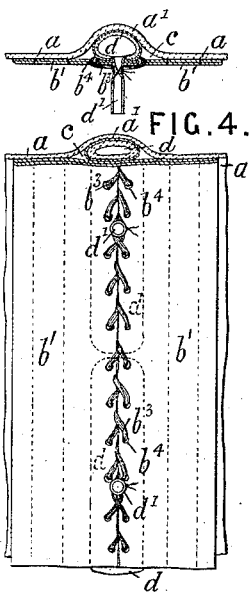
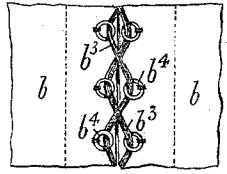
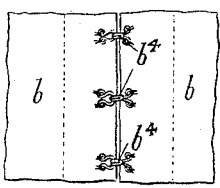
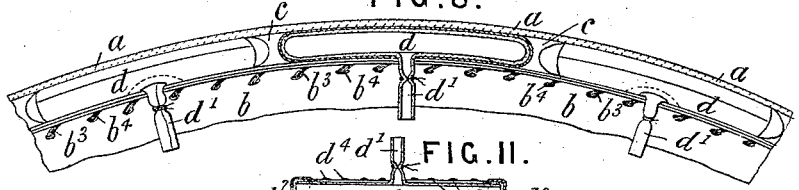
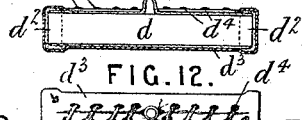
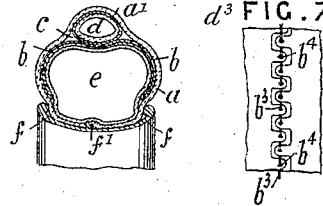
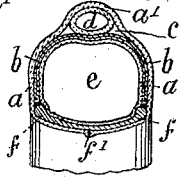
Witnesses
George Baumann
S. C. Connor
Inventor
Alfred Macdonald
By his Attorneys
Howson and Howson
THE NORRIS PETERS CO., PHOTO-LITHO., WASHINGTON, D. C.

UNITED STATES PATENT OFFICE.

ALFRED MACDONALD, OF GLASGOW, SCOTLAND.

PNEUMATIC TIRE.

SPECIFICATION forming part of Letters Patent No. 537,347, dated April 9, 1895.

Application filed September 11, 1894. Serial No. 522,709. (No model.) Patented in England February 21, 1894, No. 3,710.

*To all whom it may concern:*

Be it known that I, ALFRED MACDONALD, a subject of the Queen of Great Britain and Ireland, and a resident of Glasgow, Scotland, have invented certain Improvements in and Relating to Pneumatic Tires, (for which I have obtained an English patent, No. 3,710, dated February 21, 1894,) of which the following is a specification.

This invention has reference to improvements in and relating to pneumatic tires for cycles, omnibuses, and other road vehicles; and essentially comprises an improved method of securing pneumatic tubes to the tread cover by means of pocket strap lappings so as to form an inflated outer cover which is secured round the metal rim of wheel; and also embraces an improved construction and arrangement of sectional air tube.

In order to enable others skilled in the art to which my invention relates to understand how it may be carried into practice, I have hereunto appended an explanatory sheet of drawings in which the same reference letters are used to indicate corresponding parts in all the figures where shown.

Figures 1 and 2 are respectively a transverse section and inside longitudinal view of an inflated outer tire cover as formed in accordance with my improvements. Figs. 3 and 4 are views corresponding to Figs. 1 and 2 showing a modified way of forming and securing the pocket chamber in tire cover; while Figs. 5, 6 and 7 are detached enlarged views showing modified arrangements of securing devices from that shown in Fig. 4. Fig. 8 is a sectional view of part of tread cover with a series of sectional air tubes as secured in a pocket chamber formed on its inner surface. Figs. 9 and 10 show transverse sections of complete tires as secured round the wheel rim in accordance with my improvements; and Figs. 11 and 12 show a detached sectional elevation and a plan view respectively of one of my improved sectional tire air tubes.

Referring to the drawings:—the inflated outer cover shown in Figs. 1 and 2 is formed by taking the rubber and canvas tread part $a$ and folding it to have a ridge $a'$ at the center. A strip of canvas material $b$ is placed across the inner surface of the tread part $a$ and is secured to same along the longitudinal edges at $b'$ by sewing. A pocket space $c$ is thus formed between the ridged part $a'$ of cover and the inner web $b$; and slit openings $b^2$ are formed in the strip $b$ at spaced distances apart through which are inserted small sectional air tubes $d$.

In Figs. 3 and 4 the inner strip is shown as divided up at the center to form two longitudinal strips $b$, and after the air tubes are inserted these strips $b$ are secured together by the cord $b^3$ being laced through the holes $b^4$ in the free edges of these strips $b$.

Fig. 5 shows how the lacing may be effected through rings $b^4$ stitched to the flaps $b$; while Fig. 6 shows how these flaps may be secured together by hooks and eyes at $b^4$ and Fig. 7 shows how a wire cord $b^3$ may be laced through eyes at $b^4$.

As shown in detached views Figs. 11 and 12, the sectional air tubes would consist of an inner tube $d$ with air inflating tubular strip $d'$, and end caps $d^2$ and have an outer protecting bag covering $d^3$ which would be laced at $d^4$. These sectional tubes $d$ would be placed in position end to end in the pocket space $c$ round the tread cover $a$ as shown particularly in Fig. 8 and the cover $a$ may then be secured to the metal rim to form the complete air inflated cover tire; but, as shown in Fig. 9, an inner air tube $e$ would preferably be inserted between the cover strip $b$ and the metal rim $f$ and the cover be secured at $f'$, by a wire being threaded through eyes in its edges, so that in the event of any sectional tube $d$ getting punctured, the inner tube $e$ will keep the tire intact to the end of the rider's journey. Fig. 10 shows the outer cover $a$, as secured on the inner side of the wheel rim $f$, and the fastenings shown in Figs. 4, 5 and 6 may be similarly applied for securing the cover round the rim of wheel.

What I claim is—

1. In cycle tires, the combination of a tire cover consisting of two strips of material secured together at their edges, a pocket space being formed between them at the center, and the inner strip being provided with openings with sectional air tubes adapted to be inserted through the openings into the said pocket space, substantially as set forth.

2. In cycle tires, the combination of a tire cover consisting of two strips of material secured together at their edges, a pocket space being formed between them at the center and the inner one being provided with openings, in combination with sectional air tubes adapted to be inserted through the openings into the pocket space, and outer protecting coverings $d^3$ for the said air tubes, substantially as set forth.

In testimony whereof I have signed my name to this specification in the presence of two subscribing witnesses.

ALFRED MACDONALD.

Witnesses:
JOHN SIME,
R. C. THOMSON,
*Both of 96 Buchanan Street, Glasgow.*